United States Patent Office 3,535,382
Patented Oct. 20, 1970

3,535,382
AMINO PHENOL PRODUCTION
Bernard Beau Brown, Westfield, and Frederick A. E. Schilling, Nutley, N.J., assignors, by mesne assignments, to CPC International, Inc., a corporation of Delaware
No Drawing. Filed Nov. 2, 1967, Ser. No. 679,975
Int. Cl. C07c 91/42; C07b 1/00
U.S. Cl. 260—575                             5 Claims

ABSTRACT OF THE DISCLOSURE

Production of p-aminophenol by hydrogenating nitrobenzene in aqueous sulfuric acid containing non-ionic surfactant. Also, process for recovering the product by adding benzene and sufficient aqueous ammonia to make the pH slightly acid, to precipitate p-aminophenol.

---

The production of p-aminophenol and other aminophenolic compounds from the corresponding aryl nitro compounds by hydrogenation and rearrangement in acid media has been described in detail in prior patents. Henke et al., in U.S. Pat. 2,198,249, describe a process in which nitrobenzene mixed with aqueous sulfuric acid and platinum catalyst is heated and subjected to hydrogen at a super-atmospheric pressure (e.g. 500 pounds per square inch gauge). Spiegler, in U.S. Pat. 2,765,342, discusses the Henke et al. patent, pointing out that the latter describes yields of up to 57%. According to the Spiegler patent, better yields are obtained by adding the nitrobenzene slowly during the hydrogenation, and using relatively low hydrogen partial pressure, the partial pressure of hydrogen being below 760 mm. of mercury. Spiegler et al. also state that the inclusion of a quaternary ammonium compound in the reaction mixture gives an improvement in rate and yield. In contrast, the improvement "is not obtained with other dispersing agents which are not quaternaries" (col. 4, 11, 58, 59 of Spiegler) and the use of the condensation product from ethylene oxide and oleic acid results in a marked decrease in the rate of reduction as compared to a "control" in which no dispersing agent is present (Example 8 of the Spiegler patent). A similar procedure is described in French Pat. 1,338,899. A variation of the Spiegler process is discussed in British Pat. 856,366 of Dec. 14, 1960 which points out that the process of the Spiegler patent requires a careful degree of control in the rate of addition of the nitro compound, which can introduce difficulties, especially in large scale manufacture; the British patent proposes to minimize these difficulties by the addition of a finely divided material capable of absorbing nitrobenzene. It discloses, however, that even in the presence of the absorbent material, it is necessary to add the nitro compound gradually; thus, the use of absorbent material, according to the British patent, makes it "possible to add up to 50% more nitrobenzene before deactivation of the catalyst occurs."

With respect to the recovery of the aminophenol from solution, the Henke et al. patent describes a procedure in which the catalyst is filtered off, alkali is added to liberate the amines from their salts, the aniline is removed by steam distillation and solid p-aminophenol is obtained from the aqueous solution by cooling after adjusting the pH. The Spiegler patent refers to this method and to another procedure in which the sulfuric acid is neutralized with lime, the aniline steam-distilled off, the calcium sulfate removed from the hot solution by filtration and the p-aminophenol recovered as a powder by spray drying the aqueous solution. The French patent mentioned above also uses a lime neutralization and steam distillation, and follows it by cooling to 0–2° C. to crystallize the desired product.

We have discovered an improved process which is suitable for making the aminophenolic compounds in high yields. The new process can employ low hydrogen pressures, without requiring the gradual additional of the nitrobenzene to the reaction mixture. In this new process, the hydrogenation is carried out in the presence of a stable non-ionic surfactant having a hydrophilic polyether chain connected by an ether linkage to a hydrophobic portion having a long chain alkyl group. It is preferred to use a surfactant whose cloud point (at a concentration of 1 gram of surfactant in 100 ml. of solution) is at least about 100° C. in distilled water and is at least about 30° C., more preferably at least about 40° C., in aqueous 25% solution of NaCl. In a particularly suitable type of surfactant, the hydrophobic portion is higher alkylphenyl and the hydrophilic polyether chain is a hydroxysubstituted polyethylene oxide chain. Such non-ionic surfactants are described in French Pat. 1,414,048 of Sept. 6, 1965, for example, which discloses compounds of the formula

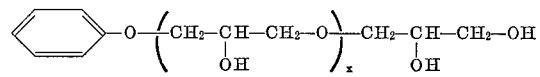

where the phenyl radical has an alkyl substitute of 8 to 18 carbon atoms. Especially good results have been attained by the use of the condensation product of one mol of nonylphenol and about 6 mols of glycidol (see Example 2 of the French patent). The surfactant is stable in the hot acidic environment prevailing in the reaction mixture and maintains its effectiveness even in the presence of amine sulfates formed during the reaction.

In a preferred aspect of the invention, the starting reaction mixture contains all the nitrobenzene to be used in the reaction, and the difficulties occasioned by the previous need for the gradual addition, as described in the prior art, are avoided. It will be understood that the amount of nitrobenzene present in suspension in the agitated initial mixture thus greatly exceeds its solubility in the aqueous sulfuric acid used as the reaction medium; for instance, the amount of nitrobenzene may be 2, 3 or even 25 or more times its solubility. Even in the presence of the surfactant the amount of nitrobenzene in the initial mixture is preferably such that the mixture separates into two liquid phases on being allowed to stand at room temperature. It is, however, within the broader scope of this invention to add the total amount of nitrobenzene in increments; it will be appreciated that here there will be no need for careful control of the amount added in each increment and that the number of increments may be much less than that used in the prior art.

The proportion of surfactant employed in the reaction mixture may vary. It may be, for example, within the range of about 0.1 to 1%, preferably within the range of about 0.05 to 0.5% and more preferably about 0.1 to 0.2%, based on the weight of the aqueous phase (water and $H_2SO_4$) in the reaction mixture at the outset.

In the aqueous sulfuric acid reaction medium the $H_2SO_4$ concentration is preferably in the range of about 15 to 30%, more preferably about 20 to 25%. Preferably the amount of sulfuric acid present is sufficient to provide one mol of $H_2SO_4$ per mol of amine formed in the reaction, so as to form an acid sulfate of the amine, and to provide sufficient additional $H_2SO_4$ to maintain a concentration of $H_2SO_4$ of at least 6.5%, based on the weight of the mixture, at the end of the reduction, so as to promote the known isomerization of aryl hydroxylamine to aminophenol (forming the aminophenol acid sulfate).

The temperature of the reaction is preferably about 80 to 95° C., more preferably 85–90° C.

The hydrogenation catalyst is preferably a platinum-on-carbon catalyst present in amount within the ranges disclosed in the Spiegler and British patents cited above, e.g. the total amount of 1% platinum-on-carbon may be about 0.5 to 5% based on the amount of nitrobenzene. It is within the broad scope of the invention to use other acid-insensitive hydrogenation catalysts such as those disclosed in the Spiegler patent.

The partial pressure of the hydrogen is preferably low, well below 760 mm. Hg, most preferably below about 400 mm. Thus when operating at a preferred temperature of 86–88° C. the hydrogen may be fed to the system at a rate such as to maintain the total pressure at atmospheric ±100 mm. Hg.

Another aspect of the invention relates to a novel process of separating the p-aminophenol from the reaction mixture. In the preferred embodiment, benzene and aqueous ammonia are added to the reaction mixture to bring the pH of the mixture to about 5.5 to 7. The p-aminophenol precipitates out of the water phase and may be removed in any convenient way, as by filtration, while the aniline and colored by-products are taken up in the benzene phase. The benzene phase, which floats on top of the aqueous phase, can be separated from the latter and the benzene distilled off, leaving a residue of aniline and by-products. The precipitated p-aminophenol is found to be highly pure and can be used, as such, in the preparation of pharmaceutical grade p-acetaminophenol, without the need for a recrystallation step. The novel recovery procedure does not require cooling below room temperature.

While the best results are obtained by the use of benzene and ammonia, it is within the broader scope of the invention to use other water-soluble bases in place of, or together with, the ammonium hydroxide (preferably weak or highly diluted bases to avoid the danger of raising the pH too high locally) and to use other water-imiscible organic solvents for aniline in place of, or together with, the benzene. Examples of such solvents are aromatic, aliphatic and cycloaliphatic hydrocarbons, chlorohydrocarbons or ethers, e.g. benzene toluene, xylene, 3-methyl pentane, n-hexane, isohexane, n-heptane, cyclohexane, methyl cyclohexane, ethylene dichloride, trichlorethylene, carbon tetrachloride, and diethyl ether. The volume of the organic solvent is preferably about 10–25% of the volume of the material being treated.

The recovery procedure described herein is particularly suitable for a reaction mixture made by the preferred process employing a nonionic surfactant. In that case the amount of the surfactant is preferable below about 0.3% of the amount of reaction mixture, in order to minimize any tendency for emulsion formation when the benzene is present. The recovery procedure may also be employed, however, for the treatment of the reaction mixtures of the prior art.

The following examples are given to illustrate this invention further. All proportions are by weight in the examples, and in the rest of the application, unless otherwise indicated.

EXAMPLE 1

A jacketed vessel, equipped with a stirrer, is charged with 1000 ml. of distilled water, 290 grams of 96% sulfuric acid (2.84 mols), 4.92 grams of 1% platinum on charcoal (a known commercial hydrogenation catalyst comprising platinum metal deposited on finely divided charcoal and having a platinum content of 1%), 246 grams of nitrobenzene (2 mols) and 2.5 grams of the nonionic surfactant produced by condensation of one mol of nonylphenol with 6 mols of glycidol. The surfactant used has the following properties: cloud points (measured with 1 gram of surfactant per 100 ml. of solution) >100° C. (in distilled water) and 43° C. (in aqueous 25% solution of NaCl); partly soluble in benzene, toluene, xylene and acetone, soluble in methanol, butanol, phosphoric acid and dilute sulfuric acid; stable in boiling 10% sulfuric acid; Draves wetting times in distilled water at 25° C., 19 seconds (when the concentration of surfactant is 0.1%), 4 seconds (when the concentration of surfactant is 0.25%); Ross-Miles foam heights (initial/after 5 minutes) 50/45 seconds (at 25° C. when the concentration of surfactant is 0.05%), 80/75 seconds (25° C., 0.1% concentration), 110/100 seconds (25° C., 0.2% concentration), 90/55 seconds (60° C., 0.05%), 130/80 seconds (60° C., 0.1%), 190/90 seconds (60° C., 0.2%). The amount and character of the surfactant used in this example is such that if stirring is stopped the quiescent mixture separates almost at once into two layers; a nitrobenzene layer and a sulfuric acid layer.

After the charged vessel has been sealed and purged, first with nitrogen and then with hydrogen gas, it is heated to a temperature of 86–88° C. and maintained at that temperature throughout the run while stirring. Hydrogen gas is introduced into the heated, sealed vessel as needed to maintain the total pressure therein at atmospheric pressure (e.g. 760 mm. Hg) ±100 mm. Hg. Hydrogen absorption is found to proceed at a rate of about 150 cc. per minute and is completed in about 8 hours (when 4 mols of hydrogen have been introduced).

The vessel is then purged with nitrogen and the reaction mixture is filtered to remove the catalyst. 2.5 grams of sodium bisulfite (to serve as an antioxidant) are added to the hot filtrate, which is then cooled to a temperature of 30° C. and mixed with 150 ml. of benzene. About 400 g. of aqueous 28% ammonia are then blended with the mixture, while stirring, under a blanket of nitrogen, so that the pH is raised to a value of 6.3–6.5. This causes precipitation of p-aminophenol crystals; on filtering and drying these crystals there are obtained 172 grams (79% of theory) of light tan crystals of melting point 184–186° C. of high quality, suitable for commercial manufacture of pharmaceutical grade p-acetaminophenol (as by the method described, for example, in U.S. Pat. No. 2,998,450 and others).

The filtrate is made alkaline by the addition of 40 grams of aqueous 50% NaOH solution, stirred and then allowed to separate into two layers. The benzene (upper) layer is removed and distilled at atmospheric pressure to recover the benzene overhead and aniline oil as a residue of distillation. The aniline oil contains 7.1% of theory of aniline and also contains highly colored by-products of the reaction. It is estimated that some 5–6% of theory of p-aminophenol is present in the filtrate.

EXAMPLE 2

(a) Example 1 is repeated using, as the initial charge, 1000 ml. of water, 116 g. of the 96% $H_2SO_4$, 1.23 g. of the platinum on charcoal, 61.5 g. of nitrobenzene, 0.62 g. of the surfactant. After 2.5 hours of the hydrogen treatment, the mixture is treated (as in Example 1) and 77% of theory of highly pure p-aminophenol crystals of melting point 184–186° C. are recovered; the aniline oil contains 7.1% of theory of aniline.

(b) Example 2a is repeated except that the surfactant is omitted. While the same predetermined pressure is maintained, the average rate of hydrogen uptake is only 93 cc./min. After four hours hydrogenation is discontinued. The yield of the p-aminophenol, of melting point 184–186° C., is only 53.4% of theory and the amount of aniline is 11.2% of theory.

While the invention has been described for the manufacture of p-aminophenol from nitrobenzene, it is also within its broad scope to employ it in the manufacture of other aromatic parahydroxyamines by the reduction of the appropriate nitro compounds, such as those disclosed in the previously cited Spiegler patent which describes a process in which the nitro compound is a mononitro derivative of an aromatic compound of the class consisting of hydrocarbons free from non-aromatic hydrocarbon substituents other than lower alkyl radicals and containing no more than two benzene rings and monochloro and dichloro derivatives thereof, said nitro compound having its nitro group attached to an aromatic nucleus which is unsubstituted in the position para to the nitro group.

It is understood that the foregoing detailed description is merely given by way of illustration, and that many variations may be made therein without departing from the spirit of the invention.

What is claimed is:

1. In the process of preparing p-aminophenol by adding hydrogen to a heated mixture containing (a) nitrobenzene, (b) aqueous sulfuric acid and (c) suspended hydrogenation catalyst, the improvement which consist essentially of the inclusion in said mixture of a surfactant prepared by the condensation of an alkylphenol wherein the alkyl group has from about 8 to about 18 carbon atoms, and glycidol.

2. The process of claim 1 wherein the alkyl group has about 9 carbon atoms.

3. The process of claim 1 wherein the amount of glycidol used is about 6 mols per mol of alkylphenol.

4. The process of claim 1 wherein the hydrogenation catalyst is platinum deposited on carbon.

5. The process of claim 1 wherein the amount of nitrobenzene used is sufficient to cause the reaction mixture to separate into two layers on standing at room temperature.

References Cited

UNITED STATES PATENTS

| 2,765,342 | 10/1956 | Spiegler | 260—575 |
| 3,383,416 | 5/1968 | Brenner | 260—575 |

FOREIGN PATENTS

| 1,414,048 | 9/1965 | France. |

CHARLES B. PARKER, Primary Examiner

C. F. WARREN, Assistant Examiner

U.S. Cl. X.R.

260—690